(12) United States Patent
Roof et al.

(10) Patent No.: US 6,605,234 B1
(45) Date of Patent: Aug. 12, 2003

(54) POLYSULFIDE SOLUTIONS AND HYDROXALKYLAMINIUM IONS FOR STABILIZING ELEMENTAL SULFUR

(75) Inventors: Glenn L. Roof, Sugar Land, TX (US); Ting S. Go, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/448,007

(22) Filed: Nov. 23, 1999

Related U.S. Application Data

(60) Provisional application No. 60/109,557, filed on Nov. 23, 1998.

(51) Int. Cl.[7] .............................................. B01D 19/00
(52) U.S. Cl. .................... 252/188.2; 210/904; 423/266; 423/562; 582/246; 582/901
(58) Field of Search ............................. 252/182.11, 391; 210/904; 588/246, 901; 423/266, 562

(56) References Cited

U.S. PATENT DOCUMENTS

| | | | |
|---|---|---|---|
| 2,194,438 A | * 3/1940 | Wernlund et al. | 210/2 |
| 2,403,939 A | 7/1946 | MacIntire | 23/144 |
| 2,722,473 A | 11/1955 | Toland, Jr. | 23/134 |
| 3,840,644 A | 10/1974 | Leigh | 423/265 |
| 3,876,756 A | 4/1975 | Romantschuk et al. | 423/562 |
| 3,887,330 A | * 6/1975 | Horvath | |
| 4,497,784 A | * 2/1985 | Diaz | 423/236 |
| 4,508,683 A | 4/1985 | Doll et al. | 422/7 |
| 4,624,837 A | 11/1986 | Baker | 423/215.5 |
| 4,627,964 A | * 12/1986 | Audeh | 423/228 |
| 4,693,873 A | 9/1987 | Baker | 423/215.5 |
| 4,737,289 A | 4/1988 | Castaldi et al. | 210/611 |
| 4,790,940 A | 12/1988 | Castaldi et al. | 210/611 |
| 5,173,306 A | 12/1992 | Green, II et al. | 424/715 |
| 5,376,749 A | 12/1994 | Miller et al. | 588/246 |
| 5,500,373 A | * 3/1996 | Lehrer | 436/109 |

FOREIGN PATENT DOCUMENTS

EP          102 712        *   3/1984

* cited by examiner

Primary Examiner—Margaret Medley
(74) Attorney, Agent, or Firm—Paula D. Morris & Associates, P.C.

(57) ABSTRACT

Hydroxalkylaminium polysulfides are used to provide cold stability to ammonium polysulfide solutions. Hydroxyalkylaminium sulfides or polysulfides also are used to solubilize unwanted sulfur. Preferred aminium ions are monohydroxyalkylaminium ions, preferably monoethanolaminium ions. When added to an aqueous stream comprising free cyanide ions (including HCN), the polysulfide solution reduces corrosion of metal equipment contacted by the stream by converting the free cyanide ions into thiocyanate ions.

29 Claims, No Drawings

POLYSULFIDE SOLUTIONS AND HYDROXALKYLAMINIUM IONS FOR STABILIZING ELEMENTAL SULFUR

This application claims the benefit of provisional application Ser. No. 60/109,557 filed Nov. 23, 1998.

FIELD OF THE INVENTION

The present invention relates to organic aminium counterions that are useful to prevent polysulfides from precipitating out of aqueous solutions, and to processes for using these counterions to produce sulfides, bisulfides, and/or polysulfides either to scavenge elemental sulfur or to prevent polysulfides from precipitating out of polysulfide solutions. The invention also relates to polysulfide solutions comprising these counterions, and to aqueous streams containing elemental sulfur complexed with these counterions. Most preferred streams contain cyanide ions before treatment, and comprise thiocyanate ions after treatment.

BACKGROUND OF THE INVENTION

Many refinery streams contain hydrogen sulfide and other sulfur-containing compounds. Many processes are aimed at removing sulfur components. However, sometimes the presence of sulfur in such refinery streams actually helps to protect the iron surfaces of the equipment used to handle this stream. Ammonium bisulfide reacts with iron at the surface of such equipment, forming an iron sulfide film. Once formed, the iron sulfide film isolates the iron surface from corrosive substances, thus preventing further corrosion.

If cyanide ion is present in the refinery stream, this delicate balance is disrupted. The cyanide ion reacts with iron ions which are freed from the FeS at equilibrium to form the very stable hexacyanoferrate (II) complex anion, which is water soluble. More and more iron ions are freed from the FeS as the system strives for equilibrium. These complexed iron ions are essentially removed as a factor in reaching equilibrium, and eventually all of the iron in the FeS film is released, exposing the fresh metal surface to corrosion. The problem is particularly acute in the sour water from fluid catalytic cracking (FCC) units.

Polysulfides, such as sodium and ammonium polysulfide, are known to control cyanide ions in waste water streams. Polysulfides convert the cyanide ions into noncorrosive, biodegradable thiocyanate ions. Thiocyanate ions do not react with FeS and are very water soluble, rendering them readily removable by water washing.

One problem with known polysulfides, such as ammonium polysulfide, is that they decompose under typical storage conditions, resulting in precipitation of free sulfur. As a result, the amount of active ingredient—sulfur—is greatly reduced, or even negligible. The precipitated sulfur also can foul or clog valves, pumps and lines, leading to expensive corrosion repair problems.

Stabilized polysulfide solutions with good cyanide scavenging capabilities are needed.

SUMMARY OF THE INVENTION

The present invention provides a composition comprising elemental sulfur complexed with organic aminium counterions, said composition having the following general formula:

$$HO—(CH_2)_n—N^+R^1R^2R^3\ S_x^-R^3R^2R^1N^+—(CH_2)_n—OH$$

wherein n is from about 1 to about 6; x is from about 2 to about 10; and $R^1$, $R^2$, and $R^3$ independently are selected from the group consisting of hydrogen, hydroxyl groups, up to two aryl groups, alkyl groups having up to about 6 carbon atoms, and groups having the following general structure $$R^4—Y—R^5—Z$$

wherein $R^4$ is selected from the group consisting of hydrogen, a hydroxyl group, an aryl group, and alkylene groups having up to about 6 carbon atoms; when $R^4$ is selected from the group consisting of hydrogen, a hydroxyl group, and an aryl group, $R^5$ and Z are nothing; when $R^4$ is an alkylene group having up to about 6 carbon atoms, $R^5$ is selected from the group consisting of hydrogen, a hydroxyl group, an aryl group, and an alkylene group having up to about 6 carbon atoms; when $R^4$ selected from the group consisting of hydrogen, a hydroxyl group, and an aryl group, Y is nothing; when $R^4$ is an alkylene group having up to about 6 carbon atoms, Y is selected from the group consisting of a hydrogen atom, a hydroxyl group, an —NH group, a sulfur atom, an alkylene group having up to about 6 carbon atoms, provided that, when Y is a hydrogen atom or a hydroxyl group, $R^5$ and Z are nothing; when $R^5$ is selected from the group consisting of hydrogen, a hydroxyl group, and an aryl group, Z is nothing; when $R^5$ is alkylene group having up to about 6 carbon atoms, Z is selected from the group consisting of a hydrogen atom, a hydroxyl group, an $NH_2$ group, and a thiol group.

DETAILED DESCRIPTION OF THE INVENTION

Commercially available forms of polysulfides generally are aqueous ammonium polysulfide solutions having concentrations of polysulfides in the range of from about 30 wt % up to about 70 wt %. These solutions contain polysulfide ions which—when the solution is added to a cyanide-containing stream—react with cyanide ions in the stream to form thiocyanate ions.

The compounds of the present invention are elemental sulfur atoms complexed with organic aminium ions, which have the following general formula:

$$HO—(CH_2)_n—N^+R^1R^2R^3\ S_x^-R^3R^2R^1N^+—(CH_2)_n—OH$$

wherein n is from about 1 to about 6, preferably from about 2 to about 4;

x is from about 2 to about 10; and $R^1$, $R^2$, and $R^3$ independently are selected from the group consisting of hydrogen, hydroxyl groups, up to two aryl groups, linear, branched, and cyclic alkyl groups having up to about 6 carbon atoms, and groups having the following general structure $$R^4—Y—R^5—Z$$

wherein $R^4$ is selected from the group consisting of hydrogen, a hydroxyl group, an aryl group, and alkylene groups having up to about 6 carbon atoms;

when $R^4$ is selected from the group consisting of hydrogen, a hydroxyl group, and an aryl group, $R^5$ and Z are nothing;

when $R^4$ is an alkylene group having up to about 6 carbon atoms, $R^5$ is selected from the group consisting of hydrogen, a hydroxyl group, an aryl group, and an alkylene group having up to about 6 carbon atoms;

when $R^4$ is selected from the group consisting of hydrogen, a hydroxyl group, and an aryl group, Y is nothing;

when $R^4$ is an alkylene group having up to about 6 carbon atoms, Y is selected from the group consisting of a hydrogen atom, a hydroxyl group, an —NH group, a sulfur atom, an alkylene group having up to about 6 carbon atoms, provided that, when Y is a hydrogen atom or a hydroxyl group, $R^5$ and Z are nothing;

when $R^5$ is selected from the group consisting of hydrogen, a hydroxyl group, and an aryl group, Z is nothing;

when $R^5$ is alkylene group having up to about 6 carbon atoms, Z is selected from the group consisting of a hydrogen atom, a hydroxyl group, an $NH_2$ group, and a thiol group;

wherein two or more of $R^1$, $R^2$, and $R^3$ may join together to form a cyclic or heterocyclic structure comprising up to 6 members.

In a preferred embodiment, the compound is "hydroxyethylaminium polysulfide," in which n is 2, $R^1$, $R^2$, and $R^3$ are hydrogen, and x is from about 2 to about 10, most preferably 4.

Although the foregoing gives specific examples of organic aminium ions encompassed by the present invention, the invention encompasses organic aminium ions as long as their amine precursors are water soluble and sufficiently basic to form stable alkylaminium sulfide and polysulfide salts. The hydroxyalkylaminium sulfides or polysulfides may be used to solubilize unwanted sulfur. The hydroxyalkylaminium polysulfides may be used to provide cold stability to ammonium polysulfide solutions.

Where used to stabilize a polysulfide solution, the solution contains a sufficient amount of the organic aminium ions to maintain cold stability down to temperatures at which the resulting solution will be stored. Such temperatures will differ depending upon the customer and the end use for the particular product. Hydroxyalkylaminium polysulfides are more stable at low temperatures (i.e., will remain soluble in the customer's storage tank even when the temperature drops to about 40° F. or less), and have a much less obnoxious odor than ammonium polysulfide solutions and the vapors may contain less of the very toxic $H_2S$.

Polysulfides having the foregoing structure may be made using several methods. These methods will be described using hydroxyalkylaminium counterions to form stable polysulfide solutions; however, other organic aminium sulfides or polysulfides may be used to solubilize elemental sulfur, whether to form stable polysulfide solutions or to scavenge unwanted elemental sulfur, using similar procedures.

In a preferred method for stabilizing a polysulfide solution using hydroxyalkylamines, a selected amount of a hydroxyalkylamine is mixed with hydrogen sulfide gas to produce aqueous hydroxyalkylaminium sulfide and bisulfide. The amount of hydroxyalkylamine is selected by the quantity of polysulfide solution to be stabilized and the amount of cold stability desired. If a given application requires cold stability down to about 0° F., then the amount of hydroxyalkylamine required typically will be about 5 wt. % of the polysulfide solution to be stabilized. On the other hand, if the application requires cold stability down to about −20° F. to about −30° F., then the amount of hydroxyalkylamine required will be from about 10 wt. % to about 15 wt. % of the polysulfide solution to be stabilized.

Once the hydroxyalkylamine is mixed with the hydrogen sulfide gas, the intermediate aqueous solution is mixed with sulfur, preferably with a stoichiometric amount of sulfur, such that the mole ratio of sulfur to aminium sulfide preferably is about 3:1. Although adducts ranging from 1:1 to 9:1 may conceivably be used under certain conditions, the primarily 3:1 adduct of hydroxyalkylaminium polysulfide is preferred. It may be desirable to then add even more of a hydroxyalkyl amine or another water soluble base, such as a hydroxide of an alkali or alkaline earth metal, such as sodium or potassium, or any other compatible base, such as tetramethyl ammonium hydroxide, in order to raise the pH of the solution to about 10 or greater, preferably greater than about 10, most preferably about 11.

In another, less efficient method, an ammonium polysulfide solution is mixed with an amount of hydroxyalkylamine sufficient to achieve cold stability. This typically requires about 5 wt. % or more, preferably about 10 wt. % or more, most preferably about 15 wt. % or more. The intermediate solution comprises a combination of (a) monoalkanolamine and ammonium polysulfide and a combination of (b) hydroxyalkylaminium polysulfide and ammonia.

Where all three of $R^1$, $R^2$, and $R^3$ are alkyl groups, an aqueous ammonium polysulfide solution is provided. Again, adducts where the ratio of sulfur to aminium sulfide ranges from 1:1 to 9:1 may conceivably be used under certain conditions, but the primarily 3:1 adduct of hydroxyalkylaminium polysulfide product is preferred. An amount of hydroxyethyltrialkyl ammonium hydroxide (HO—$CH_2CH_2N^+R_3^-OH$) is added, preferably an amount which is stoichiometric with the mols of $NH_4^+$ present. Although a stoichiometric amount is preferred, an amount which is more or less than a stoichiometric amount also will render the resulting polysulfide solution more stable than an ammonium polysulfide solution. If desired, the ammonia may be removed by sparging from the solution with an inert gas.

The invention is intended to cover the conversion of a stabilizing amount of polysulfide ions in the subject solutions to hydroxyalkylaminium polysulfide. In a preferred embodiment, the amount of polysulfide ions converted to hydroxyalkylaminium polysulfide is effective to reduce precipitation of free sulfur and/or aminium or ammonium polysulfide during storage or use at ambient temperatures for at least about 30 days when compared to ammonium polysulfide solutions comprising substantially the same amount of polysulfide which have not been stabilized according to the present invention. In a preferred embodiment, precipitation is reduced at ambient temperatures for at least about 45 days, most preferably for at least about 75 days. Crystallization and precipitation of free sulfur and the aminium polysulfide from the solution also preferably is reduced at sub-ambient temperatures of less than about −9° C. (15° F.), most preferably at less than about −12° C. (10° F.).

The hydroxyalkylaminium polysulfide may be used in methods of controlling cyanide ion concentration in any aqueous stream containing such ions. An example is the sour process water system of an FCC unit such as taught in U.S. Pat. No. 4,508,683, incorporated herein by reference. In such water streams or systems, the solutions of the present invention are injected into the system at the desired location, which readily can be determined by persons of ordinary skill in the art. An "effective" amount of the solution is injected. An "effective" amount is an amount which is effective to control cyanide ion in the stream, preferably an amount sufficient to provide an amount of polysulfide ions which is approximately stoichiometric with the amount of cyanide ions.

The pH of the aqueous system being treated preferably is from about 7.5 to about 9.5, most preferably from about 8.5 to about 9. Acidic pH's are to be avoided because they promote rapid decomposition of the polysulfides. The amount of solution added will depend upon the concentration of cyanide ions (including HCN) in the aqueous stream being treated, the concentration of the polysulfide in the solution, and the degree to which it is desired to reduce the cyanide ions in the aqueous stream.

The invention will be better understood with reference to the following examples, which are illustrative only and are not intended to limit the present invention to a particular embodiment.

EXAMPLE 1

Four samples were prepared containing 100 mmols of $(NH_4)_2S$ [prepared from an aqueous solution containing 44.6% $(NH_4)_2S$], 300 mmols of sulfur, and at least 10 g of additional water), to result in a solution containing ammonium polysulfide having the average formula $(NH_4)_2S_4$. This ammonium polysulfide solution was soluble at room temperature and had an activity of 47%. (The concentration of polysulfide ions was 36.7%.)

Two samples were used as controls or "blanks," and two samples were treated with a stoichiometric amount of monoethanolamine (MEA), i.e., 200 mmols of MEA per 100 mmol of $(NH_4)_2S$. Samples 2 and 4 were sparged for 20 minutes with nitrogen to remove ammonia and, in sample 2 (containing MEA), to convert the $(NH_4)_2S_4$ to $(HOCH_2CH_2NH_3)_2S_4$—the hydroxyethylaminium polysulfide. The solubility of the samples was observed at room temperature and at 5° C. The samples were prepared as shown in the following Table:

| Sample | Additive | Wt of additive (g) | Calculated Activity* (before sparging) | Sparged | Calculated % Polysulfide ($S_4^=$) Before Sparging | After Sparging |
|---|---|---|---|---|---|---|
| 1 | MEA | 12.2 | 61% | No | 27% | 27% |
| 2 | MEA | 12.2 | 61% | Yes | 27% | 29%** |
| 3 | Blank*** (water) | 17.4 | 31% | No | 24% | 24% |
| 4 | Blank*** (water) | 17.4 | 31% | Yes | 24% | Not applicable |

*Calculated activity is the % of all components in water.
**This percentage is based on the assumption that only ammonia is lost during sparging.
***The additional water was added in order to equal the weight of an amine component of a different sample not reported in the Table.

The following were the solubility results:

| | Solubility @ 5° C. (41° F.) at time: | | |
|---|---|---|---|
| Sample | Zero Hours (i.e., Room Temperature) | 16.5 hours | 1.4 hours |
| 1 | Soluble | Soluble | Soluble |
| 2 | Soluble | Soluble | Soluble |
| 3 | Yellow crystals | — | — |
| 4 | Yellow crystals | — | — |

The foregoing results demonstrate that hydroxyethylaminium polysulfide was more stable than ammonium polysulfide (by comparing sample 2 with sample 3). Even at 5° C. (41° F.), the hydroxethylaminium polysulfide solution remained stable. Without limiting the invention, the enhanced stability was likely due (at least in part) to the fact that 2-hydroxyethanamine (MEA) was a stronger base than ammonia at 25° C.:

$pK_b(HO-CH_2CH_2-NH_2)=4.5$ $pK_b(NH_3)=4.8$

EXAMPLE 2

Cold stability testing was performed on the MEA treated solutions of Example I by testing the stability of the solutions at the following temperatures: (41° F.); (30° F.); and, (0° F.). The polysulfides and/or sulfur remained soluble in both samples (Sample #1 and #2 in Example 1), at both temperatures for 68 hours, even when a red seed crystal was added to each sample at 22 hours at 0° F. No additional precipitation occurred in either sample even after 9 days, indicating cold temperature stability of both samples in the presence or absence of ammonia.

EXAMPLE 3

Four solutions were prepared using stoichiometric amounts of three variable components: 100% MEA; 42% $(NH_4)_2S$; and, 100% sulfur. The following chart gives the calculation for the stoichiometric amounts used in the experiment:

| Ingredient | M.W. | Grams | Millimols |
|---|---|---|---|
| 100% MEA | 61.1 | 12.2 | 200 |
| 42% $(NH_4)_2S$ | 68.0 | 16.2 | 100 |
| 100% Sulfur | 32.0 | 9.6 | 300 |

The purpose of this test was to compare the performance of monoethanolaminium polysulfide to ammonium polysulfide controls where the polysulfide concentration was maintained constant in samples A and C and in sparged samples B and D. The following samples were prepared using varying amounts of MEA:

|  | Composition before sparging | | | | | Composition After Sparging | | |
|---|---|---|---|---|---|---|---|---|
|  | | | | | | Calc. | | Conc. of |
| Sample | 100% MEA (g) | 42.0% (NH$_4$)$_2$S (g) | Sulfur (g) | D.I. H$_2$O (g) | Sparged | NH$_3$ lost by sparge* (g) | Grams sulfur present | S$_4^-$ present (wt %) |
| A | 12.2 | 16.2 | 9.6 | — | No | 0 | 12.8 | 33.7% |
| B | 12.2 | 16.2 | 9.6 | — | Yes | 3.4 | 12.8 | 37.0% |
| C | — | 16.2 | 9.6 | 12.2 | No | 0 | 12.8 | 33.7% |
| D | — | 16.2 | 9.6 | 12.2 | Yes | 3.4 | 12.8 | 37.0% |

*Samples B and D were sparged with nitrogen at a moderate rate for about one-half hour.

The loss of NH$_3$ could be expected to increase the concentration of polysulfide ions in samples B and D to 37.0% (assuming that no hydrogen sulfide was lost from samples B and D). Some water also would be lost due to sparging, which would also increase the concentration of polysulfide ions. Assuming that only ammonia was lost during sparging, one calculated 37% activity for both sparged samples, B and D (last column, above).

The foregoing samples were placed in screw cap test tubes and the caps were tightly sealed with electrical tape so that no vapor could escape during the test period. After 24 hours at room temperature, all samples remained soluble. All four samples then were placed in a cold bath maintained at 30° F. and checked at 48 hours. None of the samples had begun to form a precipitate. Consequently, the samples were placed in a cold bath maintained at 0° F. After 24 hours, none of the samples had formed a precipitate.

At 24 hours, the samples were "seeded" with either red seed crystals, assumed to be monoethanolaminium polysulfide, or yellow seed crystals, assumed to be ammonium polysulfide, in order to determine if any of the solutions were supersaturated. "Red seeds" were added to samples A and B. "Yellow seeds" were added to samples C and D. If the samples were supersaturated, then the addition of an appropriate seed crystal should have caused ammonium or monoethanolaminium polysulfide to crystallize.

No additional precipitate formed at 24 hours after the red seeds were added to samples treated with MEA (A and B). Subsequent seeding with yellow seeds at 64 hours tested for precipitation of any supersaturated ammonium polysulfide. After 64 hours, the only surviving sample—sample A—was placed in a cold bath maintained at −30° F. for 24 hours. The results are shown in the following Table:

|  | Time @ 30° F. | Time @ 0° F. | | | | | | Time @ −30° F. |
|---|---|---|---|---|---|---|---|---|
| Sample | 48 hrs | 24 hrs | 24 hrs | 48 hrs | 64 hrs | 64 hrs | 88 hrs | 24 hrs |
| A | no ppt | no ppt | red seeds added | no ppt | no ppt | yellow seeds added | no ppt | no ppt |
| B | no ppt | no ppt | red seeds added | no ppt | no ppt | yellow seeds added | ½ full of yellow crystals | — |
| C | no ppt | no ppt | yellow seeds added | ½ full of yellow crystals | — | — | — | — |
| D | no ppt | no ppt | yellow seeds added | solid mass of yellow crystals | — | — | — | — |

From the foregoing, the best performing sample was sample A—the MEA treated/unsparged sample. The sparged MEA-treated sample, or the monoethanolaminium polysulfide sample (B), arguably was superior to both sparged and unsparged ammonium polysulfide samples (C and D). However, this conclusion is debatable since yellow seeds were added to (C and D) 48 hours before they were added to (B). The observation that yellow crystals (instead of red crystals) formed in sample (B) after 88 hours at 0° F. can only be explained if one assumes that monoethanolaminium polysulfide can exist in 2 crystalline forms—one yellow and one red—or that sulfur is precipitating.

EXAMPLE 4

In order to see if sample B was superior to samples C and D of Example 3, all four samples were allowed to warm to room temperature and then were shaken for 4½ hrs with a wrist-action shaker. Samples A and C totally re-dissolved. Samples B and D still contained a few undissolved crystals. Then the cooling cycle and seeding of Example 3 was repeated, except that both yellow and red crystals were added concurrently to samples A and C so that supersaturation in either polysulfide could be detected at the same time. The results are given in the following Table:

| Sample | @ Room Temp. | Time @ 30° F. 17.5 hrs | Time @ 30° F. 17.5 hrs | Time @ 30° F. 41.5 hrs | Time @ 0° F. 29 hrs | Time @ 0° F. 29 hrs | Time @ 0° F. 71 hrs |
|---|---|---|---|---|---|---|---|
| A | Total solubility | no ppt | Red & yellow seed crystals added | Seed crystals dissolved | no ppt | Red & yellow seed crystals added | seeds dissolved |
| B | 1 yellow crystal | ~10 yellow crystals | — | ~10 yellow crystals | ~1,000 yellow crystals | — | ~10,000 yellow crystals |
| C | Total solubility | no ppt. | Red & yellow seed crystals added | Seed crystals dissolved | no ppt | Red & yellow seed crystals added | Full of red crystals |
| D | ~100 yellow crystals | ~1,000 yellow crystals | — | ~1,000 yellow crystals | ~10,000 yellow crystals | — | Full of green yellow & red crystals |

The foregoing results clearly demonstrate that sample B—the monoethanolaminium polysulfide—is superior to sample D—the sparged ammonium polysulfide sample where the initial concentration of polysulfide ions is the same. However, whether B is superior to C cannot be claimed from the above data since crystals began to form at a higher temperature in B, but sample C formed much more precipitate after 24 hours at 0° C.

EXAMPLE 5

In order to determine an optimum concentration range for MEA stabilization, six samples were prepared using varying amounts of MEA. Each sample was split into two portions, one of which was not sparged and the other of which was nitrogen sparged for 1¼ hours. The sample preparation parameters are given in the following Table:

| Sample | % MEA | g 42% (NH$_4$)$_2$S | g sulfur | g MEA | mol MEA per mol S$_4$$^=$ | Calc. % MEA after sparging |
|---|---|---|---|---|---|---|
| A | 50.0 | 16.2 | 9.6 | 25.8 | 4.2 | 53.5 |
| B | 40.0 | 16.2 | 9.6 | 17.2 | 2.8 | 43.4 |
| C | 35.2 | 16.2 | 9.6 | 12.2 | 2.0 | 35.3 |
| D | 30.0 | 16.2 | 9.6 | 11.1 | 1.8 | 33.1 |
| E | 25.0 | 16.2 | 9.6 | 8.60 | 1.4 | 27.1 |
| F | 20.0 | 16.2 | 9.6 | 6.45 | 1.0 | 22.4 |

After preparation and sparging, the samples were placed in screw cap test tubes. The caps were wrapped with electrical tape to prevent vapor loss. The samples first were tested for complete solubility at room temperature. The surviving samples were tested at lower and lower temperatures to determine the "winners"—the samples with no precipitate at −30° F. The results are given in the following Table, in which unsparged samples are designated with a prime:

| Sample | Time @ room temp 0 | Time @ room temp 48 hrs | Time @ 30° F. 48 hrs | Time @ 0° F. 24 hrs | Time @ 0° F. 24 hrs | Time @ 0° F. 48 hrs |
|---|---|---|---|---|---|---|
| A | no ppt | no ppt | no ppt | no ppt | red seeds added | a few crystals |
| B | no ppt | no ppt | no ppt | no ppt | red seeds added | ½ full of crystals |
| C | a few crystals | no change | — | — | — | — |
| D | more crystals | no change | — | — | — | — |
| E | many more crystals | no change | — | — | — | — |
| F | very many more crystals | no change | — | — | — | — |
| A' | no ppt | no ppt | no ppt | no ppt | red seed added | no ppt |
| B' | no ppt | no ppt | no ppt | no ppt | red seed added | no ppt |
| C' | no ppt | no ppt | no ppt | no ppt | red seed added | no ppt |
| D' | no ppt | no ppt | no ppt | no ppt | red seed added | no ppt |
| E' | no ppt | no ppt | no ppt | no ppt | red seed added | no ppt |
| F' | no ppt | no ppt | no ppt | no ppt | red seed added | no ppt |

[1]Zero time at room temperature means crystallization occurred in samples C, D, E, and F during the sparging operation. Note, however, that the samples were sparged for 1-1/4 hours instead of the more appropriate ½–¾ hour. As a result, more water and possibly H$_2$S was lost than necessary.

The foregoing results demonstrate that, the more MEA used, the more stable the solution. However, counterbalancing this enhanced stability with more MEA is the fact that less polysulfide is delivered per unit volume of solution. For commercialization purposes, one would have to balance the cyanide scavenging ability vs. product stability.

EXAMPLE 6

Tests were performed to determine cold stability using 10 wt. %, 15 wt. % and 20 wt. % MEA in Kerley's "Ammonium Polysulfide KC-20/40" ("APS"), a commercial aqueous solution of ammonium polysulfide available from Tessenderlo Kerley. Each sample was prepared by adding 150 g. of the APS to a solution of MEA in 8 oz. bottles. The following solutions were tested:

| Sample | % MEA | g MEA | g "KC-20/40 APS" |
|---|---|---|---|
| A | 0% | 0 | 150 g |
| B | 10% | 16.7 g | 150 g |
| C | 15% | 26.0 g | 150 g |
| D | 20% | 37.5 g | 150 g |

As the APS was added, effervescence of $NH_3$ was observed along with a small rise in temp. (2–6° C.). The bottles were shaken; then about 20 ml. of each was poured into a screw cap test tube. To prevent vapor loss, all caps were sealed with electrical tape. These 4 tubes were then placed in a Pour Point bath at −28° C. and characteristics were observed at the times indicated in the following Table:

| Sample | 15 ½ hours | 64 hours | 64 hours - seed crystals added to C & D | 90 hours | 116 hours |
|---|---|---|---|---|---|
| A | a few yellow crystals | ~2 g of yellow crystals | Sacrificed[1] | — | — |
| B | no crystals | no crystals | no crystals | ~150 mg crystals | ~150 mg crystals |
| C | no crystals | no crystals | no crystals | 0 crystal growth (seed still present) | no crystals (seed has dissolved) |
| D | no crystals | no crystals | no crystals | 0 crystal growth (seed still present) | no crystals (seed has dissolved) |

[1]This sample was taken off test, the supernatant decanted and the red crystals saved in a bottle under nitrogen. Very small pieces of these crystals were blotted dry and used as seeds in samples C & D.

From the foregoing, it was concluded that:
1. In the absence of MEA, APS exhibited poor cold stability.
2. All MEA doped samples were much better than the APS. Since a small amount of crystal growth occurred in the 10 wt. % solution of MEA, it is preferred to use MEA at 15 wt. % or 20 wt. %.

EXAMPLE 7

Tests were conducted to compare the cold stability of MEA doped APS vs. morpholine doped APS. With reference to the Tables below, the samples were prepared by:
1. Adding the appropriate amount of MEA or morpholine to I oz. bottles.
2. Following with 15.0 g of Kerley's "KC2040 APS".
3. Shaking 100 times with caps on.
4. Pouring ~10 ml of each to a 15 ml screw cap test tube.
5. Capping tightly and sealing the cap with electrical tape to avoid vapor loss.
6. Placing in −30° F. pour point bath.

The samples then were observed periodically, with the following results:

| Sample I.D. | | Amine | Observation @ time ... | | | |
|---|---|---|---|---|---|---|
| | | | 1 Day | 1.3 Days | 6 Days | 6 Days |
| A | Kerley's AMP + 0 g amine (0%) | — | no crystals | no crystals | no crystals | Seed crystals added |
| B | Kerley's AMP + 1.67 g amine (10%) | Morpholine | no crystals | no crystals | no crystals | Seed crystals added |
| C | Kerley's AMP + 2.65 g amine (15%) | Morpholine | no crystals | no crystals | no crystals | Seed crystals added |
| D | Kerley's AMP + 3.75 g amine (20%) | Morpholine | no crystals | no crystals | no crystals | Seed crystals added |
| E | Kerley's AMP + 1.67 g amine (10%) | MEA | no crystals | no crystals | no crystals | Seed crystals added |

1. Notes - Seed crystals came from sacrificed APS control from a previous experiment (1706-63). The seed crystals were red.
2. The amines used were Aldrich 99+ % purity.

| Sample I.D. | | Amine | Observation @ time after seeds added ... | | |
|---|---|---|---|---|---|
| | | | 1 Day | 2 Days | 5 Days |
| A | Kerley's AMP + 0 g amine (0%) | — | ~2 g of crystals | ~2 g of crystals | Full of crystals |
| B | Kerley's AMP + 1.67 g amine (10%) | Morpholine | looks like crystal growth | looks like crystal growth, ~10 mg | Definite crystal growth, ~100 mg |
| C | Kerley's AMP + 2.65 g amine (15%) | Morpholine | seeds only | seeds only | seeds only |
| D | Kerley's AMP + 3.75 g amine (20%) | Morpholine | seeds only | seeds only | seeds only |
| E | Kerley's AMP + 1.67 g amine (10%) | MEA | seeds only | seeds only | seeds only |

MEA provided superior cold storage stability to morpholine since APS containing 10% morpholine precipitated whereas APS containing 10% MEA did not.

Persons of ordinary skill in the art will recognize that many modifications may be made to the present invention without departing from the spirit and scope of the invention. The embodiments described herein are meant to be illustrative only and should not be taken as limiting the invention, which is defined in the following claims.

We claim:

1. A compound consisting of elemental sulfur complexed with organic aminium counterions, said compound having the following general formula:

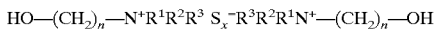

$$HO-(CH_2)_n-N^+R^1R^2R^3\ S_x^-R^3R^2R^1N^+-(CH_2)_n-OH$$

wherein
n is from about 1 to about 6;
x is from about 2 to about 10; and
$R^1$, $R^2$, and $R^3$ independently are selected from the group consisting of hydrogen, hydroxyl groups, up to two aryl groups, alkyl groups having up to about 6 carbon atoms, and groups having the following general structure $$R^4-Y-R^5-Z$$

wherein
R$^4$ is selected from the group consisting of hydrogen, a hydroxyl group, an aryl group, and alkylene groups having up to about 6 carbon atoms;
when R$^4$ is selected from the group consisting of hydrogen, a hydroxyl group, and an aryl group, R$^5$ and Z are nothing;
when R$^4$ is an alkylene group having up to about 6 carbon atoms, R$^5$ is selected from the group consisting of hydrogen, a hydroxyl group, an aryl group, and an alkylene group having up to about 6 carbon atoms;
when R$^4$ is selected from the group consisting of hydrogen, a hydroxyl group, and an aryl group, Y is nothing;
when R$^4$ is an alkylene group having up to about 6 carbon atoms, Y is selected from the group consisting of a hydrogen atom, a hydroxyl group, an —NH group, a sulfur atom, an alkylene group having up to about 6 carbon atoms, provided that, when Y is a hydrogen atom or a hydroxyl group, R$^5$ and Z are nothing;
when R$^5$ is selected from the group consisting of hydrogen, a hydroxyl group, and an aryl group, Z is nothing;
when R$^5$ is alkylene group having up to about 6 carbon atoms, Z is selected from the group consisting of a hydrogen atom, a hydroxyl group, an NH$_2$ group, and a thiol group; and,
wherein two or more of R$^1$, R$^2$, and R$^3$ may be joined to form a group comprising up to 6 members selected from the group consisting of a cycloalkyl group and a heterocyclic group.

2. A compound consisting of elemental sulfur complexed with organic aminium counterions, said compound having the following general structure $$HO-(CH_2)_n-N^+R^1R^2R^3\ S_x^-R^3R^2R^1N^+-(CH_2)_n-OH$$

wherein
n is from about 2 to about 4;
x is from about 2 to about 10; and
R$^1$, R$^2$, and R$^3$ independently are selected from the group consisting of hydrogen and substituted and unsubstituted linear and branched alkyl groups comprising from about 1 to about 6 carbon atoms; and,
wherein two or more of R$^1$, R$^2$, and R$^3$ may be joined to form a group comprising up to 6 members selected from the group consisting of a cycloalkyl group and a heterocyclic group.

3. A compound consisting of polysulfide ions complexed with monoethanolaminium ions.

4. An aqueous solution comprising:
water; and,
a compound of elemental sulfur complexed with organic aminium counterions having the following general formula:

$$HO-(CH_2)_n-N^+R^1R^2R^3\ S_x^-R^3R^2R^1N^+-(CH_2)_n-OH$$

wherein
n is from about 1 to about 6;
x is from about 2 to about 10; and

R$^1$, R$^2$, and R$^3$ independently are selected from the group consisting of hydrogen, hydroxyl groups, up to two aryl groups, alkyl groups having up to about 6 carbon atoms, and groups having the following general structure $$R^4-Y-R^5-Z$$

wherein
R$^4$ is selected from the group consisting of hydrogen, a hydroxyl group, an aryl group, and alkylene groups having up to about 6 carbon atoms;
when R$^4$ is selected from the group consisting of hydrogen, a hydroxyl group, and an aryl group, R$^5$ and Z are nothing;
when R$^4$ is an alkylene group having up to about 6 carbon atoms, R$^5$ is selected from the group consisting of hydrogen, a hydroxyl group, an aryl group, and an alkylene group having up to about 6 carbon atoms;
when R$^4$ is selected from the group consisting of hydrogen, a hydroxyl group, and an aryl group, Y is nothing;
when R$^4$ is an alkylene group having up to about 6 carbon atoms, Y is selected from the group consisting of a hydrogen atom, a hydroxyl group, an —NH group, a sulfur atom, an alkylene group having up to about 6 carbon atoms, provided that, when Y is a hydrogen atom or a hydroxyl group, R$^5$ and Z are nothing;
when R$^5$ is selected from the group consisting of hydrogen, a hydroxyl group, and an aryl group, Z is nothing; when R$^5$ is alkylene group having up to about 6 carbon atoms, Z is selected from the group consisting of a hydrogen atom, a hydroxyl group, an NH$_2$ group, and a thiol group; and,
wherein two or more of R$^1$, R$^2$, and R$^3$ may be joined to form a group comprising up to 6 members selected from the group consisting of a cycloalkyl group and a heterocyclic group.

5. The solution of claim 4 wherein said organic aminium counterions comprise an amount of said solution sufficient to maintain cold stability thereby reducing crystal formation.

6. The solution of claim 5 wherein said amount is at least about 5 wt. % of said solution.

7. The solution of claim 5 wherein said amount is at least about 10 wt. % of said solution.

8. An aqueous solution comprising:
water; and,
a compound of elemental sulfur complexed with organic aminium counterions having the following general structure $$HO-(CH_2)_n-N^+R^1R^2R^3\ S_x^-R^3R^2R^1N^+-(CH_2)_n-OH$$

wherein
n is from about 2 to about 4;
x is from about 2 to about 10; and
R$^1$, R$^2$, and R$^3$ independently are selected from the group consisting of hydrogen and substituted and unsubstituted linear and branched alkyl groups comprising from about 1 to about 6 carbon atoms; and,
wherein two or more of R$^1$, R$^2$, and R$^3$ may be joined to form a group comprising up to 6 members selected from the group consisting of a cycloalkyl group and a heterocyclic group.

9. The solution of claim 8 wherein said organic aminium counterions comprise an amount of said solution sufficient to maintain cold stability thereby reducing crystal formation.

10. The solution of claim 9 wherein said amount is at least about 5 wt. % of said solution.

11. The solution of claim 9 wherein said amount is at least about 10 wt. % of said solution.

12. An aqueous solution comprising water and a compound of hydroxyethylaminium polysulfide.

13. The solution of claim 12 wherein said monoethanolaminium ions comprise an amount of said solution sufficient to maintain cold stability thereby reducing crystal formation.

14. The solution of claim 13 wherein said amount is at least about 5 wt. % of said solution.

15. The solution of claim 13 wherein said amount is at least about 10 wt. % of said solution.

16. The solution of claim 4 further comprising thiocyanate ions.

17. The solution of claim 8 further comprising thiocyanate ions.

18. The solution of claim 12 further comprising thiocyanate ions.

19. A method for reducing corrosion of metal equipment comprising:
   providing metal equipment in contact with an aqueous stream comprising cyanide ions; and,
   treating said aqueous stream with means for reducing corrosion of said metal equipment by said aqueous stream, said means is one or more hydroxyalkyl aminium polysulfides.

20. A method for reducing corrosion of metal equipment comprising:
   introducing into an aqueous stream comprising cyanide ions an effective amount of a polysulfide solution under conditions effective to convert said cyanide ions into thiocyanate ions;
   wherein said polysulfide solution comprises:
      water; and,
      a compound of elemental sulfur complexed with organic aminium counterions having the following general formula:

wherein
      n is from about 1 to about 6;
      x is from about 2 to about 10; and
      $R^1$, $R^2$, and $R^3$ independently are selected from the group consisting of hydrogen, hydroxyl groups, up to two aryl groups, alkyl groups having up to about 6 carbon atoms, and groups having the following general structure

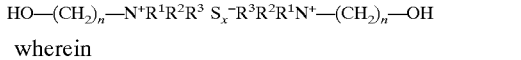

wherein
      $R^4$ is selected from the group consisting of hydrogen, a hydroxyl group, an aryl group, and alkyl groups having up to about 6 carbon atoms;
      when $R^4$ is selected from the group consisting of hydrogen, a hydroxyl group, and an aryl group, $R^5$, Y, and Z are nothing;
      when $R^4$ is an alkyl group having up to about 6 carbon atoms, $R^5$ is selected from the group consisting of hydrogen, a hydroxyl group, an aryl group, and an alkylene group having up to about 6 carbon atoms;
      when $R^4$ is an alkyl group having up to about 6 carbon atoms, Y is selected from the group consisting of a hydrogen atom, a hydroxyl group, an —NH group, a sulfur atom, an alkylene group having up to about 6 carbon atoms, provided that, when Y is a hydrogen atom or a hydroxyl group, $R^5$ and Z are nothing;
      when $R^5$ is selected from the group consisting of hydrogen, a hydroxyl group, and an aryl group, Z is nothing;
      when $R^5$ is alkylene group having up to about 6 carbon atoms, Z is selected from the group consisting of a hydrogen atom, a hydroxyl group, an $NH_2$ group, and a thiol group; and,
   wherein two or more of $R^1$, $R^2$, and $R^3$ may be joined to form a group comprising up to 6 members selected from the group consisting of a cycloalkyl group and a heterocyclic group.

21. The method of claim 20 wherein said organic aminium counterions comprise an amount of said polysulfide solution sufficient to maintain cold stability thereby reducing crystal formation.

22. A method for reducing corrosion of metal equipment comprising:
   introducing into an aqueous stream comprising cyanide ions an effective amount of a polysulfide solution under conditions effective to convert said cyanide ions into thiocyanate ions;
   wherein said polysulfide solution comprises:
      water; and,
      a compound of elemental sulfur complexed with organic counterions having the following general formula:

wherein
      n is from about 2 to about 4;
      x is from about 2 to about 10; and
      $R^1$, $R^2$, and $R^3$ independently are selected from the group consisting of hydrogen and substituted and unsubstituted linear and branched alkyl groups comprising from about 1 to about 6 carbon atoms; and,
   wherein two or more of $R^1$, $R^2$, and $R^3$ may be joined to form a group comprising up to 6 members selected from the group consisting of a cycloalkyl group and a heterocyclic group.

23. The method of claim 22 wherein said organic counterions comprise an amount of said polysulfide solution sufficient to maintain cold stability thereby reducing crystal formation.

24. A method for reducing corrosion of metal equipment comprising:
   introducing into an aqueous stream comprising cyanide ions an effective amount of a polysulfide solution under conditions effective to convert said cyanide ions into thiocyanate ions;
   wherein said polysulfide solution comprises
      water; and,
      a compound of hydroxyethylaminium polysulfide.

25. A method for producing a stabilized polysulfide solution of:
   mixing a quantity of aqueous hydroxyalkylamine with an amount of hydrogen sulfide gas effective to produce hydroxyalkylaminium sulfides;

mixing sulfur with said hydroxyalkylaminium sulfides at a ratio of sulfur to hydroxyalkylaminium sulfides of from about 1:1 to about 9:1 to produce hydroxyalkylaminium polysulfides comprising from about 1 to about 6 $CH_2$ groups.

26. The method of claim 25 wherein said hydroxyalkylamine is monoethanolamine.

27. A method for producing a stabilized polysulfide solution comprising:

means for producing sulfides; and means for treating said sulfides to produce a stabilized polysulfide solution one or more hydroxyalkyl aminium polysulfides.

28. A method for producing a stabilized polysulfide solution comprising:

water; and, a compound of stabilized polysulfide ions complexed with organic counterions, wherein said stabilized polysulfide ions have the following general formula:

$$HO-(CH_2)_n-N^+R^1R^2R^3\ S_x^-R^3R^2R^1N^+-(CH_2)_n-OH$$

wherein n is from about 1 to about 6;

x is from about 2 to about 10; and $R^1$, $R^2$, and $R^3$ independently are selected from the group consisting of hydrogen, hydroxyl groups, up to two aryl groups, alkyl groups having up to about 6 carbon atoms, and groups having the following general structure $$R^4-Y-R^5-Z$$

wherein $R^4$ is selected from the group consisting of hydrogen, a hydroxyl group, an aryl group, and alkyl groups having up to about 6 carbon atoms;

when $R^4$ is selected from the group consisting of hydrogen, a hydroxyl group, and an aryl group, $R^5$, Y, and Z are nothing;

when $R^4$ is an alkyl group having up to about 6 carbon atoms, $R^5$ is selected from the group consisting of hydrogen, a hydroxyl group, an aryl group, and an alkyl group having up to about 6 carbon atoms;

when $R^4$ is an alkyl group having up to about 6 carbon atoms, Y is selected from the group consisting of a hydrogen atom, a hydroxyl group, an —NH group, a sulfur atom, an alkylene group having up to about 6 carbon atoms, provided that, when Y is a hydrogen atom or a hydroxyl group, $R^5$ and Z are nothing;

when $R^5$ is selected from the group consisting of hydrogen, a hydroxyl group, and an aryl group, Z is nothing;

when $R^5$ is alkylene group having up to about 6 carbon atoms, Z is selected from the group consisting of a hydrogen atom, a hydroxyl group, an $NH_2$ group, and a thiol group; and, wherein two or more of $R^1$, $R^2$, and $R^3$ may be joined to form a group comprising up to 6 members selected from the group consisting of a cycloalkyl group and a heterocyclic group;

said method comprising:

mixing a quantity of aqueous hydroxyalkylamine with an amount of hydrogen sulfide gas effective to produce hydroxyalkylaminium sulfides;

mixing sulfur with said hydroxyalkylaminium sulfides at a ratio of sulfur to hydroxyalkylaminium sulfides of from about 1:1 to about 9:1 to produce hydroxyalkylaminium polysulfides; and, wherein two or more of $R^1$, $R^2$, and $R^3$ may be joined to form a group comprising up to 6 members selected from the group consisting of a cycloalkyl group and a heterocyclic group.

29. The method of claim 28 wherein said organic counterions comprise an amount of said polysulfide solution sufficient to maintain cold stability thereby reducing crystal formation.

* * * * *